(12) United States Patent
Soua et al.

(10) Patent No.: US 11,108,236 B2
(45) Date of Patent: Aug. 31, 2021

(54) ELECTRICAL ENERGY STORAGE MODULE, ASSOCIATED SYSTEM AND METHOD

(71) Applicant: GE Energy Power Conversion Technology Limited, Warwickshire (GB)

(72) Inventors: Samir Soua, Villebon-sur-Yvette (FR); Alfred Permuy, Villebon-sur-Yvette (FR)

(73) Assignee: GE Energy Power Conversion Technology Limited

( * ) Notice: Subject to any disclaimer, the term of this patent is extended or adjusted under 35 U.S.C. 154(b) by 0 days.

(21) Appl. No.: 16/530,422

(22) Filed: Aug. 2, 2019

(65) Prior Publication Data

US 2020/0044452 A1 Feb. 6, 2020

(30) Foreign Application Priority Data

Aug. 3, 2018 (EP) .................................... 18306059

(51) Int. Cl.
*H01M 10/44* (2006.01)
*H02J 3/32* (2006.01)
*H02J 7/00* (2006.01)
*H02M 7/539* (2006.01)

(52) U.S. Cl.
CPC ............. *H02J 3/32* (2013.01); *H01M 10/441* (2013.01); *H02J 7/0018* (2013.01); *H02M 7/539* (2013.01)

(58) Field of Classification Search
USPC ......................................................... 307/43
See application file for complete search history.

(56) References Cited

U.S. PATENT DOCUMENTS

| 6,518,856 B1* | 2/2003 | Casale ...................... H01P 5/04 333/124 |
| 2011/0101795 A1* | 5/2011 | Scharnick ............ G05B 19/058 307/326 |
| 2013/0002203 A1* | 1/2013 | Kuraishi ............... H02J 7/0019 320/134 |

(Continued)

FOREIGN PATENT DOCUMENTS

JP WO2014199628 * 12/2014
WO 2014199628 A1 12/2014

OTHER PUBLICATIONS

EP Extended Search Report for related application 18306059.9 dated Nov. 9, 2018; 5 pp.

*Primary Examiner* — Daniel Kessie
*Assistant Examiner* — Xuan Ly
(74) *Attorney, Agent, or Firm* — Wood IP LLC

(57) ABSTRACT

An electrical energy storage module is provided. The storage module includes a reversible electrical energy conversion device intended to be connected to an electrical energy source and an electrical energy storage device. The storage device includes a first branch including two filter capacitors in series, and a second branch including two identical electrical energy storage means connected in series. A node common to the two capacitors and a node common to the two energy storage means are coupled by an impedance. A first end of the first and second branches is connected to the electrical energy conversion device, and a second end of the first and second branches is connected to the electrical energy conversion device.

13 Claims, 6 Drawing Sheets

(56) References Cited

U.S. PATENT DOCUMENTS

| | | | | |
|---|---|---|---|---|
| 2014/0319919 A1* | 10/2014 | Fu | ............... | H02M 7/539 |
| | | | | 307/82 |
| 2015/0239366 A1* | 8/2015 | Jestin | ............... | B60L 15/38 |
| | | | | 307/10.1 |

* cited by examiner

ART ANTERIEUR

US 11,108,236 B2

ELECTRICAL ENERGY STORAGE MODULE, ASSOCIATED SYSTEM AND METHOD

CROSS REFERENCE TO RELATED APPLICATIONS

This application claims priority to and the benefit of the filing date of EP Application No. 18306059.9 filed Aug. 3, 2018, for ELECTRICAL ENERGY STORAGE MODULE, ASSOCIATED SYSTEM, AND METHOD, which is hereby incorporated by reference.

BACKGROUND

The present disclosure relates generally to the storage of electrical energy produced, and more particularly, to an electrical energy storage module, a method of implementing the module, and an electrical energy storage system comprising a plurality of modules.

At least some known electrical power circuits include at least one battery electrical energy storage system, known by the acronym BESS "Battery Energy Storage System". Within at least some known electrical energy storage systems, the electrical energy storage system is controlled in such a way such to store electrical energy in a battery, for example, or a supercapacitor, and to release the stored energy, for example when the electrical power circuit is no longer receiving electrical energy. More specifically, at least some known electrical energy storage systems, include a reversible voltage inverter coupled to an energy source, and at least one electrical energy storage device coupled to the inverter, such as a bank of batteries coupled in series. In such systems, the inventor charges the batteries when the energy source generates electrical power, or discharges the batteries when the energy source is consuming electrical power.

The effectiveness of such electrical energy storage systems may be limited. For example, coupling the batteries in series reduces the current within the cables. However, because the batteries are coupled in series, if one battery becomes defective, the electrical energy storage is no longer operational. In addition, within such systems, it is not possible to individually control each battery within the electrical energy storage to provide preventative maintenance, for example.

It is therefore desirable to provide an electrical energy storage system that has enhanced reliability and that provided increased flexibility and control as compared to known electrical energy storage systems.

DETAILED DESCRIPTION

Figure 1:
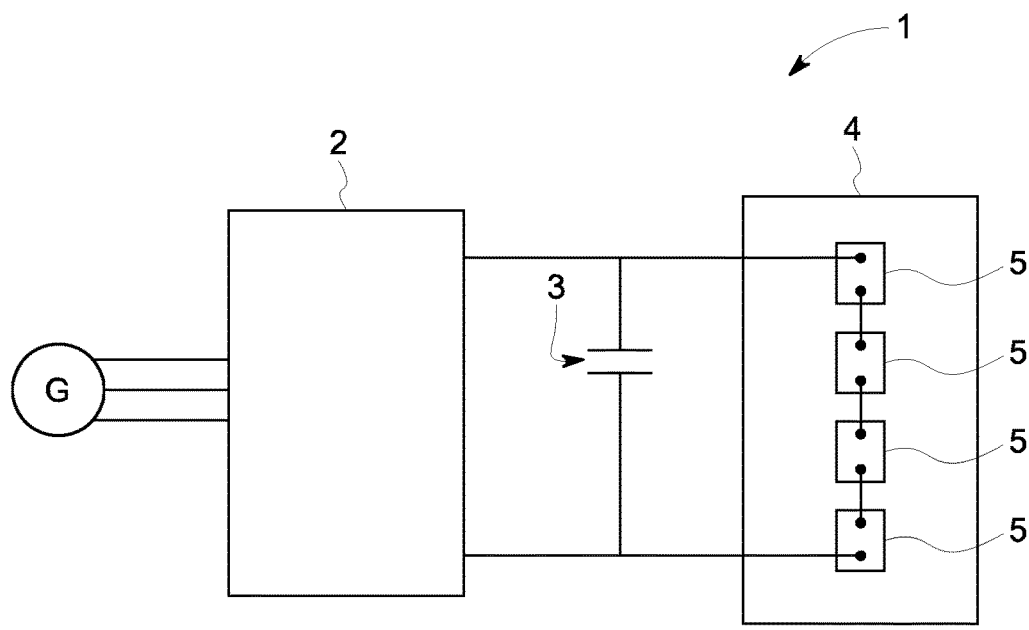
FIG. 1 illustrates an exemplary schematic of a known battery electrical energy storage system.

FIG. 1 illustrates an exemplary schematic of a known battery electrical energy storage system. The battery electrical energy storage system 1 includes a reversible voltage inverter 2, of two voltage levels for example, connected to a three-phase reversible electrical energy source G, as well as to a filter capacitor 3 and an electrical energy storage device 4 connected to the inverter. For example, the electrical energy storage device 4 comprises batteries 5 connected in series.

The inverter 2 is controlled in such a way as to charge the batteries 5 when the source G generates electrical power, or to discharge the batteries 5 when the source G is consuming electrical power. Although a single source G is represented, the system 1 can be connected to a plurality of independent sources.

The batteries 5 are generally low-voltage batteries, i.e. the voltage at the terminals of each battery is less than 1500 volts. The servicing of low-voltage batteries does not require medium- or high-voltage authorization, particularly for the isolation, maintenance or replacement of batteries. The electrical energy storage device 4 is sized in such a way as to store a predetermined quantity of electrical energy that can reach several megawatts for several minutes or several hours, for example. It is useful to connect a plurality of batteries 5 in series in order to reduce the current within the cables. Consequently, the voltage at the terminals of the electrical energy storage device 4 is generally greater than 1500 volts, for example from 3,000 to 20,000 volts.

The device 4 belongs to the category of high-voltage devices requiring restrictive authorizations for any servicing on the device, particularly for the isolation, maintenance or replacement of the device. Since all the batteries are connected in series, if one battery 5 is defective, the device 4 is no longer operational. In the case wherein the electrical energy storage system 1 supplies a charge, the charge is no longer supplied. The electrical energy storage system 1 is therefore not very reliable. Moreover, it is not possible to individually control each battery 5 incorporated into the device 4 in order to provide preventive maintenance of the system.

In view of the foregoing, according to a first aspect, an electrical energy storage module is proposed comprising a reversible electrical energy conversion device intended to be connected to an electrical energy source and an electrical energy storage device. The storage device comprises a first branch comprising two filter capacitors in series and a second branch comprising two identical electrical energy storage means, the node common to the two capacitors and the node common to the two energy storage means being connected by an impedance, a first end of the first and second branches being connected to the electrical energy conversion device, a second end of the first and second branches being connected to the electrical energy conversion device.

According to another characteristic, the storage device further comprises a disconnection switch connected between the second ends of said branches and an output terminal, a shunt switch connected on the one hand between the disconnection switch and the output terminal, and on the other hand to the first end of said branches in such a way as to shunt the electrical energy storage means, and a grounding switch connected between the node common to the two storage means and ground.

According to a first embodiment, the reversible electrical energy conversion device comprises a three-level reversible voltage inverter connected to the first and second ends of the first and second branches. Preferably, the three-level reversible voltage inverter is further connected to the common node between the two filter capacitors.

According to a second embodiment, the reversible electrical energy conversion device comprises a first and a second reversible voltage inverter at two identical levels, the first inverter being connected on the one hand to the first end of the first and second branches, and on the other hand to the common node between the two filter capacitors, and the second inverter being connected on the one hand to the first end of the first and second branches, and on the other hand to the common node between the two filter capacitors, each inverter being intended to be connected to a different source of electrical energy.

Advantageously, the electrical energy storage means comprises a battery or a supercapacitor and monitoring means capable of measuring the electrical and thermal characteristics of each energy storage means and of transmitting the measured values to control means.

According to another aspect, an electrical energy storage system is proposed comprising at least one energy storage module as previously defined and control means capable of controlling the energy storage module, wherein the storage device and the power converter are connected by at least two connections.

According to one embodiment, the electrical energy storage system further comprises a transformer comprising a primary circuit intended to be connected to a reversible voltage source and a secondary circuit in star configuration connected to the energy conversion device, the neutral point of the secondary circuit being connected to the common node between the two electrical energy storage means.

According to another embodiment, the storage device and the power converter are connected by three connections, the storage modules being connected in series, each inverter being intended to be connected to an independent reversible voltage source.

According to still another embodiment, the storage device and the power converter are connected by means of three connections and comprise a transformer comprising a primary circuit intended to be connected to a reversible voltage source and as many secondary circuits as there are inverters, each inverter being connected to a different secondary circuit.

According to another aspect, an electrical energy storage method is proposed comprising a step of balancing the voltages between at least two storage means each connected to a secondary circuit of a transformer. The voltages are balanced by means of said secondary circuit.

According to one mode of implementation, the method further comprises an isolation step comprising a first phase during which a disconnection switch of each of the storage modules is opened in such a way as to disconnect the modules from each other, then a second phase during which the grounding switch of each of the storage modules is closed. According to one mode of implementation, if an electrical energy storage module is defective, the shunt switch of the defective electrical energy storage module is opened, then a shunt switch of the electrical energy storage module is closed in such a way as to isolate said defective module from the other modules.

Other features and advantages of the invention will appear upon reading the following description of embodiments of the invention, given solely as nonlimiting examples and referring to the drawings.

Figure 2:
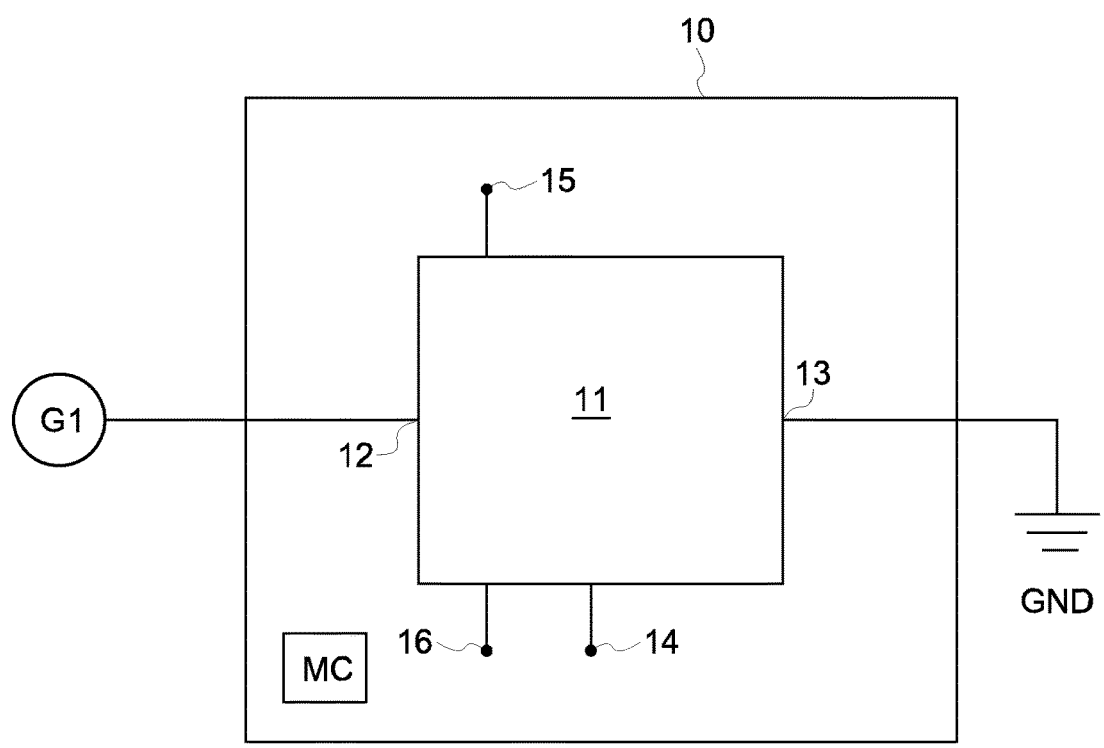
FIG. 2 is a an exemplary schematic of an electrical energy storage system.

FIG. 2 is a an exemplary schematic of an electrical energy storage system 10. In a first embodiment, electrical energy storage system 10 is connected on the one hand to a first reversible three-phase electrical voltage source G1, and on the other hand to ground GND. The first voltage source G1 is for example an electrical network comprising a wind turbine and an electrical load. The storage system 10 comprises an electrical energy storage module 11 comprising a first terminal 12 connected to the voltage source G1, a second terminal 13 connected to ground GND, a third terminal 14, a first interconnection terminal 15 and a second interconnection terminal 16 capable of connecting modules together in series. The storage system 10 further comprises control means MC capable of controlling the electrical energy storage module 11.

Figure 3:
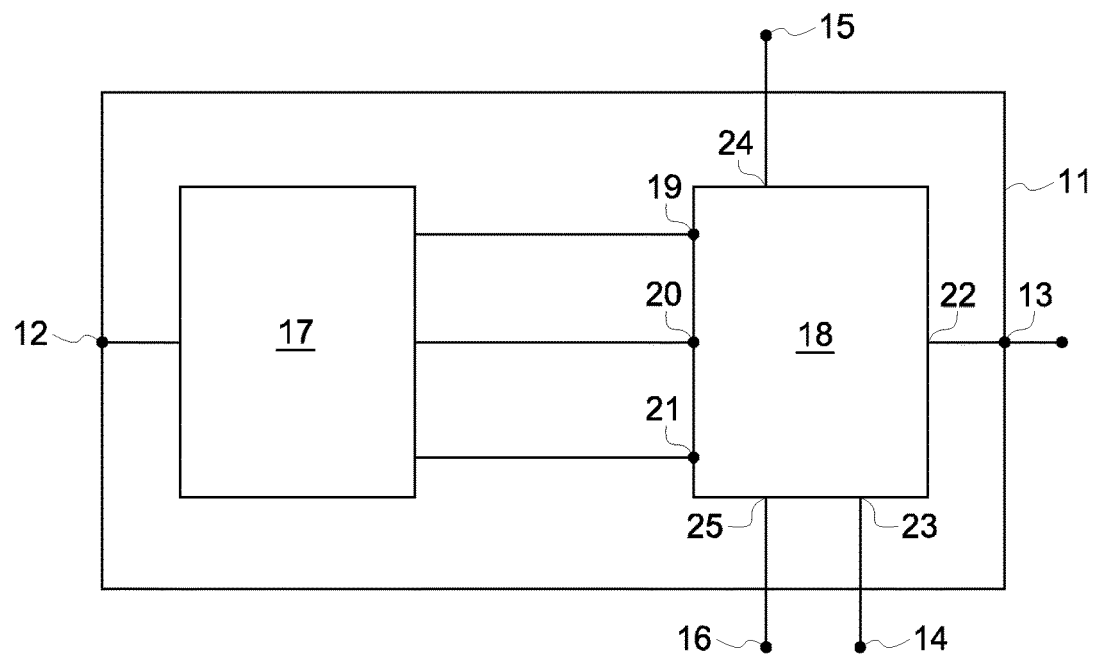
FIG. 3 shows an exemplary embodiment of an electrical energy storage module that may be used with the electrical energy storage system shown in FIG. 2.

FIG. 3 shows a first embodiment of the electrical energy storage module 11. This module comprises a reversible electrical energy conversion device comprising a three-level voltage inverter 17 controlled by the control means MC, for example according to a pulse width modulation type drive signal (PWM) and an electrical energy storage device 18. The electrical energy storage device 18 here comprises three input terminals 19, 20 and 21 connected to different outputs of the voltage inverter 17, a fourth terminal 22 connected to the second terminal 13 of the storage module 11, an output terminal 23 connected to the third terminal 14 of the storage module 11, a fifth terminal 24 connected to the first interconnection terminal 15 and a sixth terminal 25 connected to the second interconnection terminal 16. The voltage inverter 17 is further connected to the first terminal 12 of the storage module 11 and is controlled by the control means MC.

Figure 4:
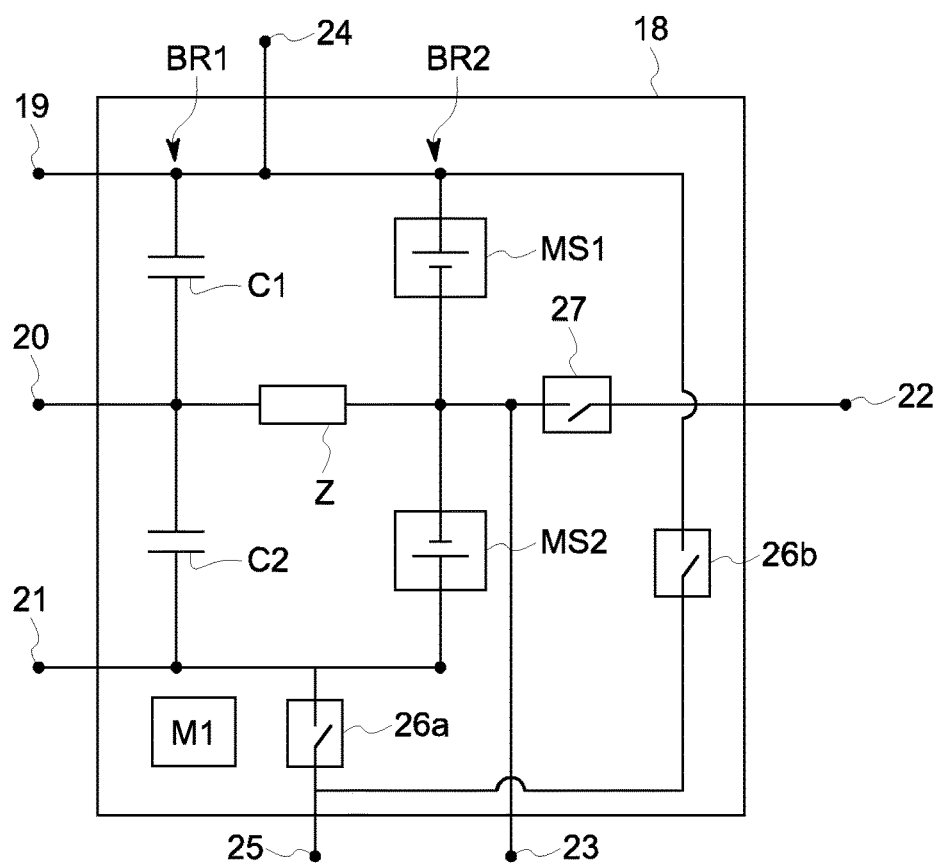
FIG. 4 illustrates an exemplary electrical energy storage device that may be used with the electrical energy storage system shown in FIG. 2.

With reference to FIG. 4, an embodiment is shown of an electrical energy storage device 18. The electrical energy storage device 18 comprises a first branch BR1 comprising two identical filter capacitors C1 and C2 connected in series and a second branch BR2 comprising two identical electrical energy storage means MS1 and MS2 connected in series.

The node common to the two capacitors C1 and C2 and the common node between the two storage means MS1 and MS2 are connected by an impedance Z. A first end on the first and second branches BR1 and BR2 is connected to the first input terminal 19 of the device 18, a second end of the first BR1 and second BR2 electrical energy storage branches is connected to the third input terminal 21 and the node common to the two capacitors C1 and C2 is connected to the second input terminal 20. The node common to the two storage means MS1 and MS2 is connected to the output terminal 23 of the storage device 16. The first end of the first and second branches BR1 and BR2 is further connected to the fifth terminal 24 of the device 18 and the second end of the first BR1 and second BR2 electrical energy storage branches is connected to the sixth terminal 25 of the device 18.

The electrical energy storage device 18 further comprises a disconnection switch 26a connected between the second end of the first BR1 and second BR2 branches and the sixth terminal 25 of the device 18, a shunt switch 26b connected on the one hand between the disconnection switch 26a and the sixth terminal 25, and on the other hand to the first end of the first BR1 and second BR2 branches, and a grounding switch 27 connected between the node common to the two storage means MS1 and MS2 and the fourth terminal 22 of the device 16. The switches, for example, each comprise a knife shut-off device and/or a semiconductor-controlled device.

The device 18 further comprises monitoring means M1 capable of measuring the electrical and thermal characteristics of the storage means MS1 and MS2, particularly the voltage at the terminals of the storage means MS1 and MS2 and the temperature of the storage means.

The control means MC are further capable of controlling the disconnection and shunt switches 26a and 26b and the grounding switch 27, and are further capable of processing the values measured by the monitoring means M1.

The storage means MS1 and MS2 can each comprise, for example, a battery or a super capacitor, the voltage at the terminals of the storage means being equal to or less than 1500 VDC in such a way that each storage means is governed by the rules relating to low-voltage storage devices. The impedance Z is sized in such a way as to stabilize the current particularly during switching phases of the energy conversion device 17.

Figure 5:
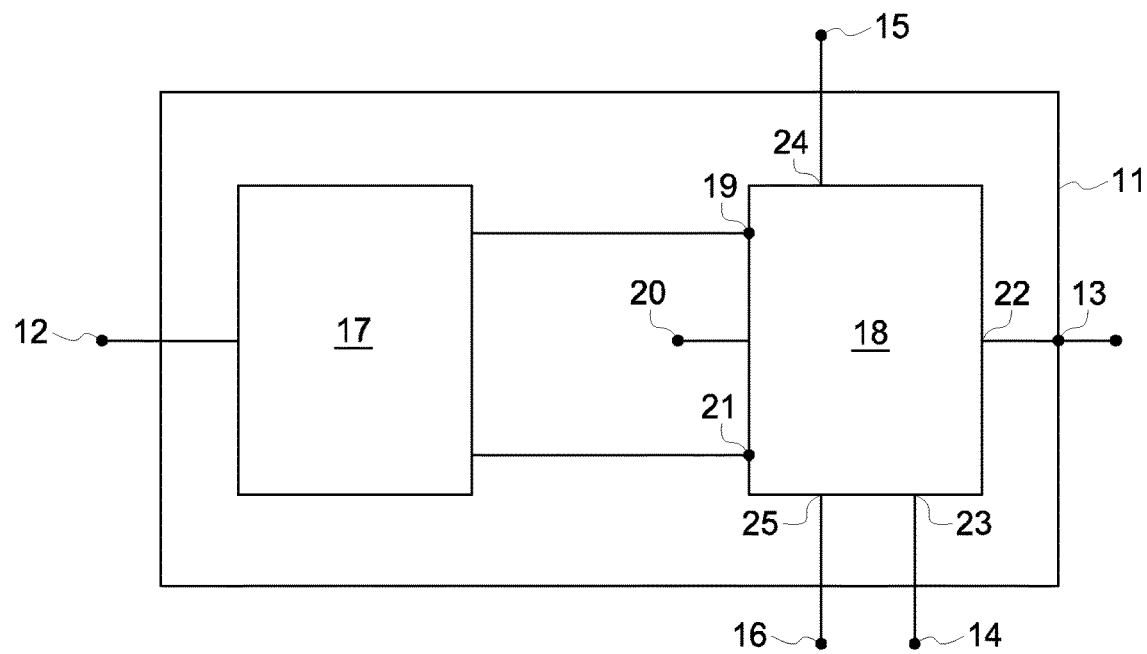
FIG. 5 is a schematic of an alternative embodiment of the electrical energy storage module shown in FIG. 3.

FIG. 5 shows a second embodiment of the electrical energy storage module 11. Those elements that are identical to those described previously are identified by the same numerical references. This includes the three-level reversible voltage converter 17 connected to the electrical energy storage device 18. The second input terminal 20 of the storage device 18, however, is not connected to the inverter 17.

Figure 6:
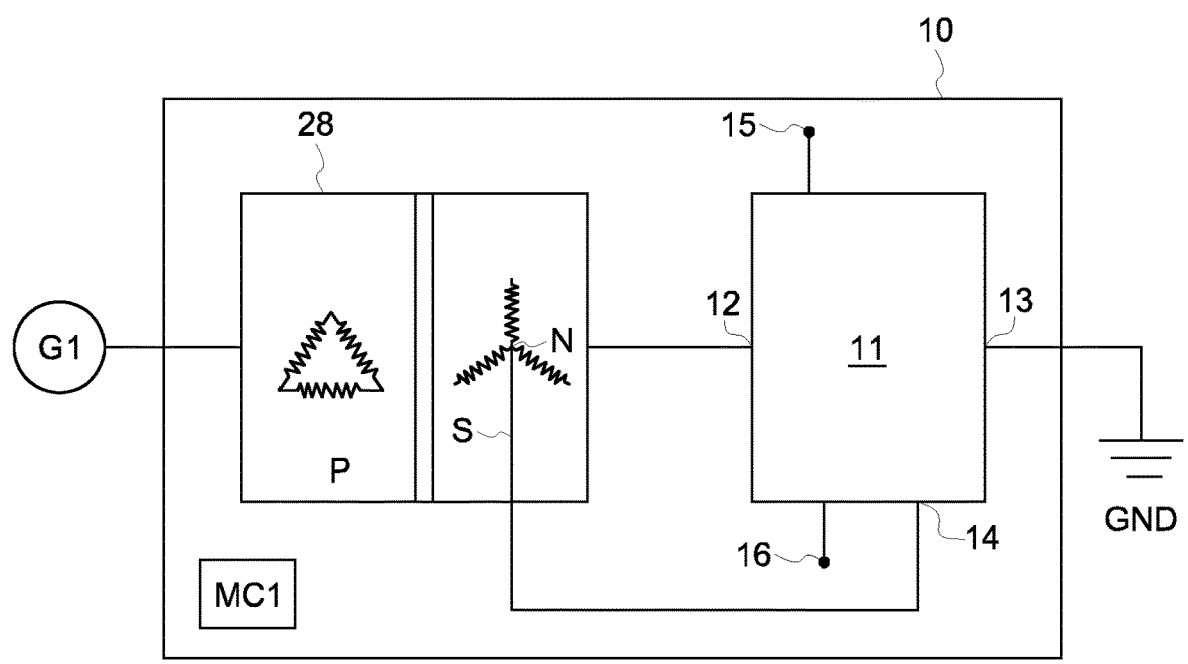
FIG. 6 is a schematic of an alternative embodiment of the electrical energy storage system shown in FIG. 2.

With reference to FIG. 6, a second embodiment is illustrated of an electrical energy storage system 10 connected to the first reversible three-phase electrical voltage source G1 and to ground GND. Those elements that are identical to those described previously are identified by the same numerical references. The storage system 10 comprises the electrical energy storage module 11 according to the second embodiment of FIG. 5 and a transformer 28 comprising a primary circuit P in triangle configuration and a secondary circuit S in star configuration. The primary circuit P is connected to the source G1 and the secondary circuit S is connected to the first terminal 12 of the storage module 11.

The storage system 10 further comprises means MC1 capable of controlling the storage module 11, controlling the disconnection and shunt switches 26a and 26b and the grounding switch 27, and further capable of processing the values measured by the monitoring means M1. A neutral point N of the secondary circuit S is connected to the third terminal 14 of the module 11 in such a way as to balance the DC voltage at the terminals of the storage means MS1 and MS2.

In the event of imbalance between the DC voltages of the storage means MS1 and MS2, caused for example by the source G1 generating second order current harmonics, the control means MC1 apply a potential at the neutral point N of the secondary circuit S of the transformer in such a way as to generate a current circulating from the storage means having the highest DC voltage. The generated current discharges said storage means in such a way as to reduce the voltage at the terminals thereof and to balance the voltages at the terminals of the means MS1 and MS2 in such a way that the value of the voltage at the terminals of the means MS1 and MS2 is equal. In the embodiment described in FIG. 3, an imbalance between the DC voltage is of the storage means MS1 and MS2 is partially eliminated by the injection by means of the inverter of a third-level harmonic on each phase according to the principle of over modulation.

Figure 7:
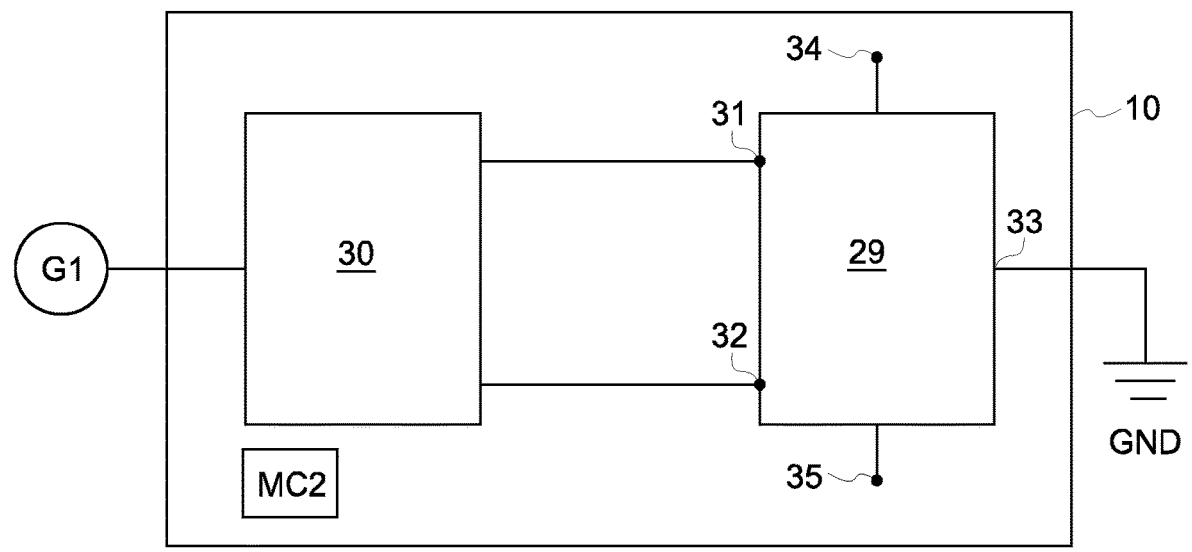
FIG. 7 is a schematic of another alterative embodiment of the electrical energy storage system shown in FIG. 2.

With reference to FIG. 7, a third embodiment is illustrated of an electrical energy storage system 10 connected to the first reversible three-phase electrical voltage source G1 and to ground GND. The storage system 10 comprises an electrical energy storage module 29 and a transformer 30 comprising a primary circuit, for example in triangle configuration, connected to the source G1 and two secondary circuits in identical configuration, for example in star configuration, each connected to a different input 31 and 32 of the storage module 29. The storage module 29 comprises a terminal 33 connected to ground GMD and two interconnection terminals 34 and 35. The storage system 10 further comprises control means MC2 capable of controlling the storage module 29, controlling the disconnection and shunt switches 26a and 26b and the grounding switch 27, and are further capable of processing the values measured by the monitoring means M1.

Figure 8:
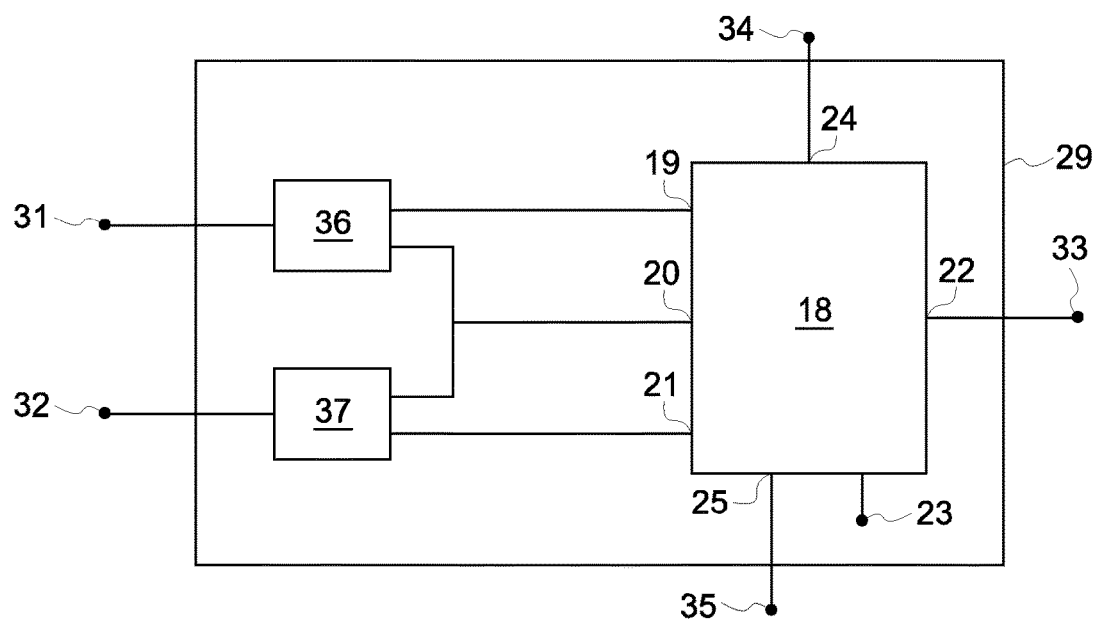
FIG. 8 is a schematic of another alterative embodiment of the electrical energy storage module shown in FIG. 3.

With reference to FIG. 8, an embodiment is shown of an electrical energy storage device 29. The electrical energy storage module 29 comprises first and second identical reversible inverters 36 and 37, at two voltage levels and the electrical energy storage device 18. The first inverter 36 is connected to the input 31 and the second inverter 37 is connected to the input 32 of the storage module. A first and a second output of the first inverter 36 are connected respectively to the first input terminal 19 and the second input terminal 20 of the electrical energy storage device 18.

A first and a second output of the first inverter 37 are connected respectively to the second input terminal 20 and the third input terminal 21 of the electrical energy storage device 18. The fourth terminal 22 of the storage device 18 is connected to terminal 33 of the electrical energy storage module 29. The output terminal 23 of the storage device 18 is not used. The fifth 24 and sixth 25 terminals of the storage device 18 are connected respectively to the first and second interconnection terminals 34 and 35. In the event of an imbalance between the DC voltages of the storage means MS1 and MS2, the control means MC1 control the first and second inverters 36 and 37 in such a way that the storage means having the highest DC voltage at the terminals thereof is discharged and charges the second storage means through the secondary circuits of the transformer 30 until the values of the voltages at the terminals of the means MS1 and MS2 are equal.

In the different embodiments of the electrical energy storage system described above, a single electrical energy storage device 18 is incorporated in the storage system. Consequently, the storage system stores a maximum DC voltage of two times 1500 VDC or 3000 VDC. The voltage at the terminals of each storage means being less than 1500 VDC, the "low voltage" rule is applied. When the storage system stores electrical energy at a DC voltage of more than 3000 volts, a plurality of electrical energy storage modules must be connected in such a way that the value of the voltage at the terminals of all of the electrical energy storage devices is equal to the value of the voltage required, for example, by a set of specifications. The storage modules are connected to each other by means of interconnection terminals 15 and 16.

Embodiments of an electrical energy storage system 10 comprising two modules will now be described.

Figure 9:
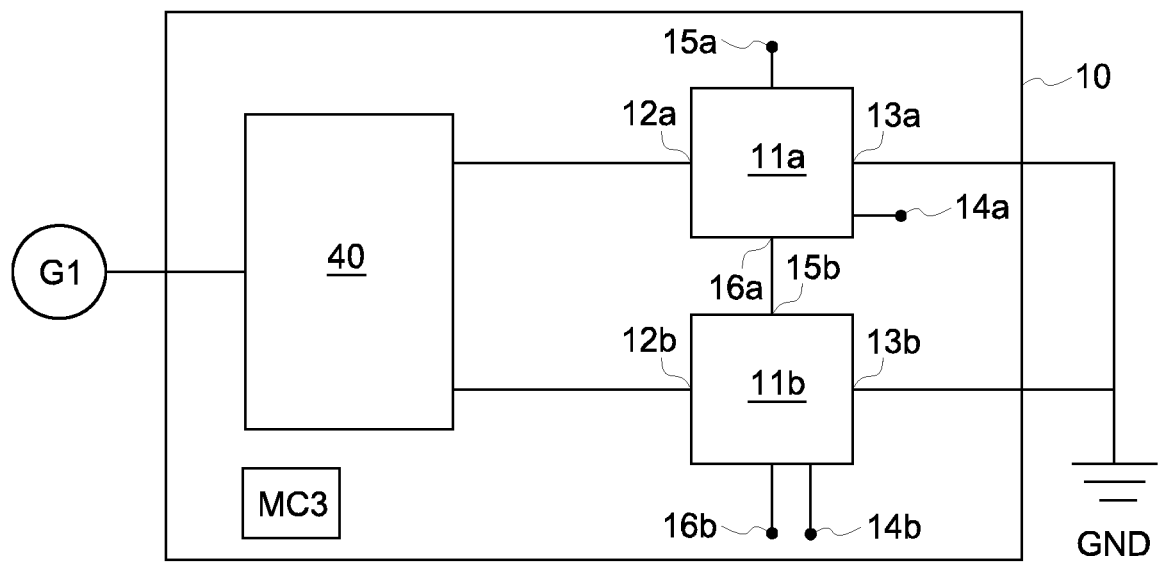
FIG. 9 is a schematic of a further alterative embodiment of the electrical energy storage system shown in FIG. 2.

Reference is now made to FIG. 9, which shows a third embodiment of an electrical energy storage system 10 connected to the first reversible three-phase electrical voltage source G1 and to ground GND. The storage system 10 comprises first and second storage modules 11a and 11b that are identical to the first embodiment of FIG. 3, and a transformer 40 comprising a primary circuit, for example in triangle configuration, connected to the source G1 and two identical secondary circuits, for example in star configuration.

A first secondary circuit of the transformer 40 is connected to a first terminal 12a of the first storage module 11a and a second secondary circuit of the transformer 40 is connected to a first terminal 12b of the second storage module 11b. A second terminal 13a and 13b of storage modules 11a and 11b is connected to ground GMD. A first interconnection terminal 15b of the second storage module 11b is connected to the second terminal 16a of the first storage module 11a. The storage means incorporated in the first and second modules 11a and 11b are connected in series. The storage system 10 further comprises control means MC3 capable of controlling the first and second modules 11a and 11 b. Each storage module 11a and 11b includes a third terminal 14a and 14b, not connected in this embodiment.

In the event of an imbalance in the voltages between the different storage means, the balancing of the voltages is effected by a transfer of electric energy controlled by the control means MC3 between the storage means, by means of the secondary circuits of the transformer as previously described in the embodiment illustrated in FIG. 8.

Figure 10:
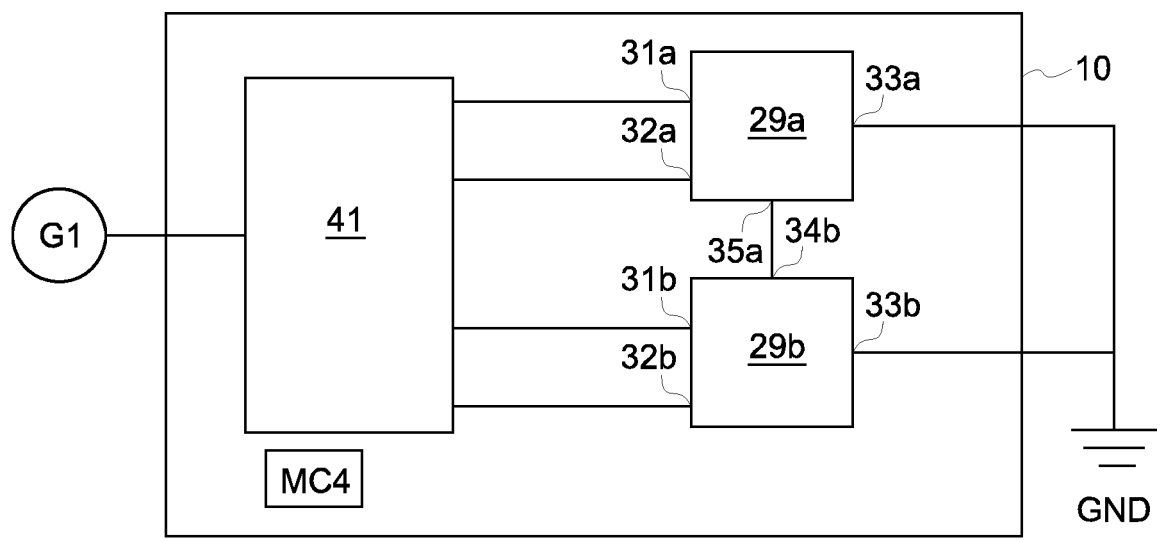
FIG. 10 is a schematic of yet another alterative embodiment of the electrical energy storage system shown in FIG. 2.

The storage system 10 described in FIG. 10 comprises first and second storage modules 29a and 29b that are identical to the embodiment of FIG. 8, and a transformer 41 comprising a primary circuit, for example in triangle configuration, connected to the source G1 and four identical secondary circuits, for example in star configuration. First and second secondary circuits of the transformer 41 are connected respectively to different first and second inputs 31a and 32a of the first storage model 29a. Third and fourth secondary circuits of the transformer 41 are connected respectively to different first and second inputs 31b and 32b of the second storage model 29a. A terminal 33a and 33b of storage modules 29a and 29b is connected to ground GMD. A first interconnection terminal 34b of the second storage module 29b is connected to a second interconnection terminal 35a of the first storage module 29a.

The storage system 10 further comprises control means MC4 capable of controlling the first and second electrical energy storage modules 29a and 29b. In the event of an imbalance in the voltages between the different storage means, the balancing of the voltages is effected by a transfer of electric energy controlled by the control means MC4 between the storage means, by means of the secondary circuits of the transformer as previously described with reference to FIG. 8.

Although the embodiments illustrated by FIGS. 9 and 10 comprise only two electrical energy storage modules, depending upon the quantity of energy to be stored, an electrical energy storage system can comprise more than two storage modules connected to each other as previously described. In this case, the transformer comprises as many secondary circuits as there are voltage inverters, each inverter being connected to a different secondary circuit.

In the various embodiments of the storage system 10, the transformer performs a galvanic isolation function between the electrical energy storage modules. The previously described electrical energy storage system 10 is connected to a single source G1. However, it can be connected to a plurality of independent reversible voltage sources. In this case, each source is directly connected to a different inverter incorporated into the system. There is no longer a galvanic isolation transformer.

Figure 11:
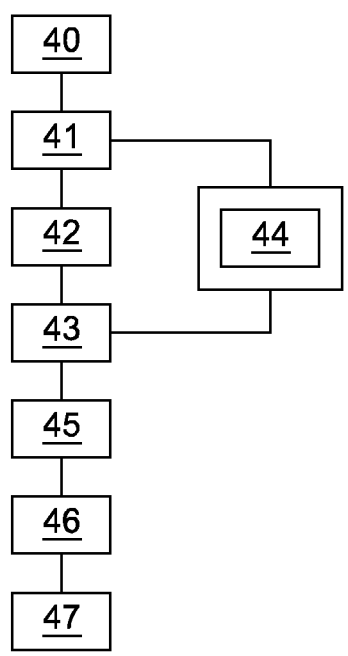
FIG. 11 illustrates an exemplary mode of implementation of the electrical energy storage system shown in FIG. 2.

Reference is now made to FIG. 11, which describes one mode of implementation of the electrical energy storage device 10. It is assumed that initially the storage system 10 is isolated and the storage means are discharged. The disconnection and shunt switches 26a and 26b and the grounding switch 27 are open. The source G1 generates electrical energy. In a first initialization step 40, the control means control the disconnection switch 26a of each of the storage modules in such a way as to close it.

During a subsequent charging step 41, the control means control the voltage inverter(s) of the storage system in such a way as to charge the electrical energy storage means. In particular, the monitoring means of each storage module determine the voltage at the terminals of each storage means and the temperature of each storage means. When the storage means are charged, i.e. when the voltage at the terminals of each storage means is equal to a predetermined value less than 1500 VDC during a waiting step 42 the control means control the inverters in such a way that they do not allow any current to pass.

When the source G1 calls for electrical energy, in a discharge step 43, the control means control the inverters in such a way as to discharge the storage means at the voltage and frequency called for by the source G1.

During the steps of charging 41 and discharging 43, in a sub-step of isolation 44, the control means balance the voltage at the terminals of each of the storage means such that the voltage at the terminals of each of the storage means is identical.

During the steps of initialization, charging, discharging and waiting, the monitoring means transmit the values measured at the control means. If the control means identify a defective storage means, such as an overheated storage means, during a step 45 the control means open, during a first phase, the disconnection switch 26a of the electrical energy storage module comprising the defective storage means, then during a second phase, close the shunt switch 26b of the electrical energy storage module comprising the defective storage means. The defective storage means is isolated, with the result that the storage system remains operational. Advantageously, the storage system operates just as well even if one or more storage modules are defective.

When the storage system 10 is not operational, for example during a maintenance operation, in an isolation step 46 during a first phase the control means open the disconnection switch 26a of each of the storage modules, then during a second phase the control means close the grounding switch 27 of each of the storage modules (step 47). Advantageously, the voltage at the terminals of each of the storage means is less than 1500 VDC.

What is claimed is:

1. An electrical energy storage module comprising:
    a reversible electrical energy conversion device configured to be coupled to a source of electrical energy; and
    an electrical energy storage device comprising:
    a first branch comprising two filter capacitors in series; and
    a second branch comprising two identical electrical energy storage means, wherein a first node common to and between the two capacitors and a second node common to and between the two energy storage means are connected together by an impedance to stabilize current during switching phases of the reversible electrical energy conversion device, and wherein a first end of the first and second branches are connected to one terminal of the reversible electrical energy conversion device, and a second end of the first and second branches are connected to another terminal of the reversible electrical energy conversion device;

wherein the storage device further comprises:

a disconnection switch connected between the second end of said branches and an output terminal;

a shunt switch connected on the one hand between the disconnection switch and the output terminal, and on the other hand to the first end of said branches in such a way as to shunt the electrical energy storage means; and a grounding switch connected between the node common to the two storage means and ground.

2. The electrical energy storage module according to claim 1, wherein the reversible electrical energy conversion device comprises a three-level reversible voltage inverter connected to the first and second ends of the first and second branches.

3. The electrical energy storage module according to claim 2, wherein the 3-level reversible voltage inverter is further connected to the common node between the two filter capacitors.

4. The electrical energy storage module according to claim 1, wherein the reversible electrical energy conversion device comprises a three-level reversible voltage inverter connected to the first and second ends of the first and second branches.

5. The electrical energy storage module according to claim 1, wherein the reversible electrical energy conversion device comprises a first and a second reversible voltage inverter at two identical levels, the first inverter being connected on the one hand to the first end of the first and second branches, and on the other hand to the common node between the two filter capacitors, and the second inverter being connected on the one hand to the first end of the first and second branches, and on the other hand to the common node between the two filter capacitors, each inverter being intended to be connected to a different source of electrical energy.

6. The electrical energy storage module according to claim 1, wherein the electrical energy storage means comprises a battery or a supercapacitor and monitoring means capable of measuring the electrical and thermal characteristics of each energy storage means and of transmitting the measured values to control means.

7. An electrical energy storage system comprising at least one energy storage module according to claim 1 and further comprising a control means capable of controlling the energy storage module, wherein the storage device and the power converter are connected by at least two connections.

8. The electrical energy storage system according to claim 7, further comprising a transformer comprising:

a primary circuit intended to be connected to a reversible voltage source; and a secondary circuit in star configuration connected to the energy conversion device, the neutral point of the secondary circuit being connected to the common node between the two electrical energy storage means.

9. The electrical energy storage system according to claim 7, wherein the storage device and the power converter are connected by three connections, the storage modules being connected in series, each inverter being intended to be connected to an independent reversible voltage source.

10. The electrical energy storage system according to claim 7, wherein the storage device and the power converter are connected by three connections and comprise a transformer comprising a primary circuit intended to be connected to a reversible voltage source and as many secondary circuits as there are inverters, each inverter being connected to a different secondary circuit.

11. An electrical energy storage method comprising:

balancing voltages between at least two storage modules wherein each storage module according to claim 1 and further comprising a first input and a second input wherein each first input and each second input are connected to different secondary circuits of a transformer, characterized in that the voltages are balanced via said different secondary circuits.

12. The method according to claim 11, further comprising an isolation technique comprising:

performing a first phase wherein a disconnection switch of each of the storage modules is opened such that the storage modules are disconnected from each other; and implementing a second phase wherein a grounding switch of each of the storage modules is closed.

13. The method according to claim 11, wherein, if an electrical energy storage module is defective, the disconnection switch of the defective electrical energy storage module is opened, and then a shunt switch of the electrical energy storage module is closed in such a way as to isolate said defective module from the other modules.

* * * * *